United States Patent
Faresse

(10) Patent No.: US 12,448,832 B2
(45) Date of Patent: Oct. 21, 2025

(54) DOOR OPERATING SYSTEM

(71) Applicant: DORMAKABA SCHWEIZ AG, Rümlang (CH)

(72) Inventor: Marc Faresse, Châtonnaye (CH)

(73) Assignee: DORMAKABA SCHWEIZ AG, Wetzikon (AT)

( * ) Notice: Subject to any disclaimer, the term of this patent is extended or adjusted under 35 U.S.C. 154(b) by 0 days.

(21) Appl. No.: 18/562,617

(22) PCT Filed: May 25, 2022

(86) PCT No.: PCT/EP2022/064291
§ 371 (c)(1),
(2) Date: Nov. 20, 2023

(87) PCT Pub. No.: WO2022/248597
PCT Pub. Date: Dec. 1, 2022

(65) Prior Publication Data
US 2024/0247533 A1    Jul. 25, 2024

(30) Foreign Application Priority Data
May 26, 2021 (EP) .................................... 21176062

(51) Int. Cl.
*E05F 15/73* (2015.01)
*G06T 7/246* (2017.01)
(Continued)

(52) U.S. Cl.
CPC .............. *E05F 15/73* (2015.01); *G06T 7/246* (2017.01); *G06T 7/73* (2017.01); *G06V 10/40* (2022.01);
(Continued)

(58) Field of Classification Search
CPC ................ E05F 15/73; E05F 2015/767; E05F 2015/434; G06T 7/246; G06T 7/73;
(Continued)

(56) References Cited

U.S. PATENT DOCUMENTS

| | | | |
|---|---|---|---|
| 10,977,826 B1 * | 4/2021 | Russo | E05F 15/73 |
| 2016/0180195 A1 * | 6/2016 | Martinson | G06V 10/764 |
| | | | 382/103 |
| 2019/0354777 A1 * | 11/2019 | Beck | G06V 20/52 |

FOREIGN PATENT DOCUMENTS

| | | | |
|---|---|---|---|
| DE | 102018104202 A1 | 8/2019 | |
| DE | 10201810104202 * | 8/2019 | E05F 15/73 |

(Continued)

OTHER PUBLICATIONS

European Search Report for European Application No. 21176062.4, dated Nov. 24, 2021, 8 pages.
(Continued)

*Primary Examiner* — Amara Abdi
(74) *Attorney, Agent, or Firm* — CANTOR COLBURN LLP

(57) ABSTRACT

A door operating system including a control unit and at least one sensor device, the system configured to operate a door from a closed state into an opened state. The sensor device is configured to observe an observation area and provide image data to the control unit, which is configured to receive and process the observation image data. Processing the data includes detecting an individual inside the observation area, extracting pose information and/or viewing direction information corresponding to the individual, determining, based on the pose information and/or the viewing direction information, a probability value representing the probability that the individual intends to pass the door, and determining whether the probability value is higher than a probability threshold value, wherein the door operating system operates
(Continued)

the door from a closed state in an opened state if the control unit determines that the probability value is higher than a probability threshold value.

13 Claims, 6 Drawing Sheets

(51) Int. Cl.
  *G06T 7/73* (2017.01)
  *G06V 10/40* (2022.01)
  *G06V 10/764* (2022.01)
  *G06V 10/77* (2022.01)
  *G06V 20/52* (2022.01)
  *G06V 40/10* (2022.01)
  *G06V 40/20* (2022.01)

(52) U.S. Cl.
  CPC ............ *G06V 10/764* (2022.01); *G06V 10/77* (2022.01); *G06V 20/52* (2022.01); *G06V 40/10* (2022.01); *G06V 40/20* (2022.01); *E05F 2015/767* (2015.01); *E05Y 2400/45* (2013.01); *G06T 2207/20076* (2013.01); *G06T 2207/20081* (2013.01); *G06T 2207/30196* (2013.01); *G06T 2207/30232* (2013.01)

(58) Field of Classification Search
  CPC . G06T 2207/20076; G06T 2207/20081; G06T 2207/30196; G06T 2207/30232; G06V 10/40; G06V 10/764; G06V 10/77; G06V 20/52; G06V 40/10; G06V 40/20; G06V 40/103; G06V 40/18; E05Y 2400/45; E05Y 2400/00; E05Y 2400/452; E05Y 2400/456
  See application file for complete search history.

(56) References Cited

FOREIGN PATENT DOCUMENTS

| KR | 20150018914 | * | 2/2015 | ........ E05F 2015/767 |
| KR | 20150018914 A | | 2/2015 | |

OTHER PUBLICATIONS

International Search Report for International Application No. PCT/EP2022/064291, dated Sep. 6, 2022, 4 pages.
Written Opinion for International Application No. PCT/EP2022/064291, dated Sep. 6, 2022, 6 pages.

* cited by examiner

DOOR OPERATING SYSTEM

CROSS-REFERENCE TO RELATED APPLICATIONS

This application is a 35 U.S.C. § 371 National Stage patent application of PCT/EP2022/064291, filed on 22 May 2022, which claims the benefit of European patent application no. 21176062.4, filed on 26 May 2021, the disclosures of which are incorporated herein by reference in their entirety.

FIELD OF THE DISCLOSURE

The present disclosure relates to a door operating system for operating a door, preferably an automatic sliding door, from a closed state into an opened state and/or vice versa, and to a corresponding computer implemented method. Further, the present disclosure relates to an access control system including said door operating system and a door, preferably an automatic sliding door.

BACKGROUND OF THE DISCLOSURE

Door operating systems have become widely used for operating different types of doors, e.g. automatic sliding doors, to eliminate the need of manually opening and closing actions. Examples of typical fields of application are in public places such as department stores, office buildings, train stations, airports or the like.

Contemporary sensor-based automatic door operating systems are based on infrared, ultrasonic/radio or other wireless sensing methods. The first can be further divided into active and passive approaches. In the active approach infrared signals are emitted from the sensor and reflected signals are captured to determine if there is any object close to the door. This approach is capable of identifying the position and the speed of an object, but its high cost has made it less popular. The passive approach detects the infrared signals radiated by objects and is the most widely used for being simple and low cost. The ultrasonic/radio approach, on the other hand, emits ultrasonic or radio waves to scan the environment and analyzes the returned signals for operating a respective door.

Although these techniques are all successful in detecting objects, they still generate many false opening operations of the door. For instance, an animal or a passing pedestrian may accidentally trigger the door and cause a false opening action. Frequent false opening operations energy waste, in particular air conditioning energy waste, and also reduce equipment lifetime.

SUMMARY OF THE DISCLOSURE

The present disclosure therefore provides a door operating system for operating a door which facilitates a reduction of the number of false openings. Further, the present disclosure provides a corresponding method for a door operating system facilitating a reduction of the number of false openings.

According to the present disclosure, the above-mentioned objects are addressed through the features of the independent claims. In addition, further advantageous embodiments follow from the dependent claims and the description. An initial starting point for tackling the objectives is to enable a door operating system to understand the type and the intention of the objects.

In particular, the above-mentioned objects are addressed by a door operating system, comprising a control unit and at least one sensor device, the door operating system being configured to operate a door from a closed state into an opened state, wherein the sensor device is configured to observe an observation area and provide respective observation image data to the control unit, wherein the control unit is configured to receive and process the observation image data, wherein processing the observation image data comprises at least:
- detecting an individual inside the observation area,
- extracting pose information and/or viewing direction information corresponding to the respective individual,
- determining, based on the pose information and/or the viewing direction information, a probability value representing the probability that the respective individual intends to pass the door,
- determining whether the probability value is higher than a probability threshold value, wherein the door operating system operates the door from a closed state in an opened state if the control unit determines that the probability value is higher than a probability threshold value.

The door operating system is preferably an automatic door operating system and the door is preferably an automatic door. In particular, the present disclosure may be used for automatic sliding doors.

The control unit may be disposed in the door operating system or, alternatively, the door operating system may communicate with a control unit which is disposed separately. A separately disposed control unit may be a network device such as a server.

The door operating system may be disposed at or proximate to the door and may be allocated to a respective door. Accordingly, the observation area may be predetermined, preferably to define a close range next to the respective door to which the door operating system is allocated to. The close range preferably starts directly at the door, for instance at the door leaf plane.

Preferably, the observation image data provided by the sensor unit are life data feed signals. The sensor device may include one or more optical sensors, preferably cameras. The observation image data may be stored in a memory for a limited time and deleted afterwards, for instance in order to comply with data protection law. Further, it may be provided that the sensor unit performs preprocessing of the life data feed signals whereby the life data feed signals are filtered such that irrelevant data is removed to obtain observation image data which is passed on to the control unit. For instance, snow or rain signals may be filtered.

The probability threshold value is a value that indicates that a detected individual intends to pass the door. For example, the probability threshold value can be a percentage number or an absolute normalized number.

By processing the observation image data, it can be confirmed that a detected object is an individual and the individual indeed intends to pass the respective door or that it is highly likely that the detected individual intends to pass the respective door. The confirmation is carried out based on the characteristics of the respective individual, in particular the pose and/or viewing direction of the respective individual.

Detecting an individual among other objects, in particular distinguishing between individuals and non-individuals, may be carried out based on the shape of a detected object. The shape of the detected objects can be analyzed to detect the presence of certain predefined characteristics that indicate that the object is an individual. The shape may alternatively or additionally be compared with a shape database, while the shape database contains a set of different shapes of individuals or predefined shape characteristics. The shape database may be trained via machine learning. Further, the detection of an individual may be carried out or supported by means of artificial intelligence.

Extracting pose information of a detected individual may be carried out in particular via a recognition of the position, orientation and/or movement of the body extremities. In other words, extracting pose information may be based on the real time characteristics of the skeleton of the individual. The skeleton of a detected individual can be recognized, for example, via matching with a pattern database which may be trained via machine learning, or recognized by means of artificial intelligence.

Extracting viewing direction information of a detected individual may be carried out in particular via a recognition of the orientation and/or movement of the head and/or eyes. In other words, extracting viewing direction information may be based on the real time orientation and/or movement of the head of the individual which includes the respective eyes. The viewing direction may be approximated considering on the one hand the orientation and/or movement of characteristic parts of the head, for instance the nose and/or the forehead and/or the chin and/or eye sockets. On the other hand, in order to obtain a more precise viewing direction information, the eyeball and its features, for instance the pupil, may be detected. The extraction of viewing direction information may be carried out via matching with a head-eye database which may be trained via machine learning. Further, the extraction of viewing direction information may be carried out or supported by means of artificial intelligence.

The door operating system may further be capable of tracking the moving speed of an object, in particular of a person, in order to have a further indication whether the person is invalid and/or handicapped. Based on this indication, the door may be operated in an adapted way, e.g. selecting a lower opening speed or triggering the opening operation earlier.

The door operating system of the present disclosure eliminates the need of manually opening and closing a respective door and at the same time provides the particular advantage of reduction in the number of false openings significantly. As a direct result, energy waste, in particular air conditioning energy waste is prevented. Further, equipment lifetime is significantly increased.

Preferably it is provided that the pose information includes motion of pose of the respective individual and/or viewing direction information includes motion of viewing direction of the respective individual.

Considering the motion of pose and/or viewing direction is a further valuable indication for determining the intension of a respective individual. The consideration of this data thus increases the accuracy of the door operating system.

Preferably, detecting an individual inside the observation area is performed by means of an image classification engine, wherein the image classification engine is configured to detect individuals, preferably including the number of individuals, among one or more objects which may be represented by the observation image data, the image classification engine preferably being trained via machine learning. The training may be initially performed via supervised machine learning.

For training the image classification engine, supervised machine learning may be used initially upon installation. An installer may therefore train a certain number of runs during the initial setup. Afterwards, the image classification engine may further develop in accuracy via unsupervised machine learning.

The number of individuals may be used to determine the opening width of the door while operating the door from a closed state into an opened state.

It may be further provided that extracting pose information and/or viewing direction information corresponding to the respective individual is performed by means of an image analysis engine, wherein the image analysis engine is configured to extract a feature vector corresponding to the respective individual, the feature vector comprising a first set of features indicative for a pose of the individual and/or a second set of features indicative for a viewing direction of the individual.

The feature vector may, in other words, be a superordinate set of features comprising the first and second set of features relating to an individual's pose and viewing direction respectively. The first set of features may for instance comprise at least the position and/or orientation of the legs, feet, arms, body or head. The second set of features may for instance comprise at least the orientation of the nose, forehead, chin or eye sockets.

Further, the first set of features may at least comprise the orientation of one or more extremities of a skeleton of the respective individual, preferably at least the direction in which toes of respective feet of the individual are pointing.

The direction in which toes of respective feet of the individual are pointing, is one of the most valuable characteristics of the skeleton for estimating the direction in which an individual is facing. The information is an especially useful indicator for determining that an individual is at all considering passing through the door.

Further, the first set of features and the second set of features may be at least partially mutually associated, the image analysis engine being configured to perform an inconsistency detection loop on the basis of the associated features for detecting and preferably rectifying the feature vector.

Advantageously, information about the direction in which toes of respective feet of the individual are pointing may for example be used to verify if the detection of, e.g. the viewing direction is correct. If needed, the feature vector can be rectified automatically in order to ensure a reliable basis for determining the probability value whether an individual intends to pass the door.

Further, the image analysis engine may be trained by means of machine learning, preferably unsupervised machine learning.

Preferably, it may be provided that the probability threshold value is dynamically adjusted by a probability adjustment engine, wherein the probability adjustment engine validates, for a detected individual for whom it is determined that the probability value is higher than a probability threshold value, whether the respective individual actually passed the respective door.

Adjusting the probability threshold value via the probability adjustment engine may be carried out through calculation of a validity rate representing the rate of individuals for which the decision that the individual intends to pass the door, was determined correctly. The validity rate may be compared with a predefined target validity rate which represents a desired validity rate of e.g. 95%. Based on the comparison, the probability threshold value may be raised or lowered. In particular, the probability threshold value may be raised, if the validity rate is lower than the target validity rate and vice versa. The target validity rate representing a desired validity rate preferably takes into account an optimal balance between two objectives: the prevention of false openings and the prevention of false non-openings. The target validity rate may alternatively be a target validity interval of e.g. 90 to 95%.

In determining the probability value representing the probability that the respective individual intends to pass the door, path information obtained by a path tracking engine may be considered, wherein the path tracking engine provides a set of most frequently used paths for passing a respective door and considers, based on motion of a detected individual, whether the respective individual is about to use one of the most frequently used paths, wherein preferably the set of most frequently used paths is obtained and/or dynamically updated through machine learning.

The most frequently used paths are usually different according to the position of a door. For example, the most frequently used paths are different if an entrance door is placed on a corner of a building, in comparison with placing an entrance door in the center of the building. Therefore, machine learning, preferably unsupervised machine learning, may take the overall circumstances of where a respective door is placed into account. Over time, the most frequently used paths are trained by the path tracking engine such that the information about on which path a detected individual is moving, may be considered for getting a higher accuracy in operating the door.

Preferably, the observation area is allocated to the respective door and is sectioned into a plurality of zones, namely at least a tracking zone and an activation zone, the activation zone being located closer to the respective door than the tracking zone, wherein observation image data from the tracking zone is used to wake up the control unit and/or respective engines if an object, preferably an individual, enters the tracking zone, wherein observation image data from the activation zone is used to trigger operating the respective door from a closed state into an opened state.

Additionally, in order to prevent energy waste, a separate sensor may be provided to wake up the door operating system or the control unit of the door operating system. The separate sensor may for instance use infrared and/or ultrasonic to detect objects.

Further, it may be provided a fallback option to provide operating the door even though the detection of an individual and/or the determination of the intention of an individual does not decide correctly. For this case, it may be provided that the door operating system recognizes predetermined gestures which may be carried out by individuals in front of the door. In case the door operating system recognizes such gesture, it may operate the door from a closed state into an opened state, irrespective of the probability value. Such gestures may include waving the hand or the like. An individual standing in front of a respective door may use the gesture if it is intended to pass the door and the door accidentally remains closed. It may be further provided that the door operating system recognizes predetermined gestures that cause the door operating system to operate the door from an opened state into a closed state if the door accidentally remains open. The fallback option is particularly advantageous for individuals in a wheelchair.

Further, it may be provided that the observation area is allocated to the respective door and is sectioned into a plurality of zones, namely at least an activation zone and a safety zone, the safety zone being located closer to the respective door than the activation zone, wherein observation image data from the activation zone is used to trigger operating the respective door from a closed state into an opened state, wherein observation image data from the safety zone is used to operate the respective door into a safety mode, wherein in the safety mode the respective door is operated from a closed state into an opened state irrespective of the probability value.

Through sectioning the observation area into different zones, the accuracy and reliability of the door operating system is further increased. Additionally, a transit movement of an individual from one zone into another zone may be used by the door operating system to estimate, if the respective individual passed the door one time, whether the individual intends to pass the door again or intends to leave the door. This information may be used to remain the door opened or to trigger operating the door from an opened state into a closed state.

Preferably, operating the respective door from a closed state into an opened state is performed using a door motor disposed at the door configured to open the door, wherein the opening speed of the door is set depending on motion speed of the respective individual and/or the opening width of the door is set depending on the quantity of detected respective individuals.

For example, considering an automatic sliding door, a high opening speed is preferred if an individual moves very fast and intends to pass the door. On the other hand, a low opening speed is sufficient, if the detected individual moves slowly. By adapting the opening speed to the moving speed of a detected individual that intends to pass the door, it may be prevented that the individual collides with the door in case of a fast moving individual, and energy may be saved in case of a slow-moving individual.

Further, again considering an automatic sliding door, for a high quantity of individuals with the intension to pass the door, it is preferred that the door opens widely. On the other hand, for a single individual that intends to pass the door, a rather small opening width of the door is sufficient. By adapting the opening width of the door to the quantity of individuals, the convenience of passing the door may be raised in case of a high quantity of individuals, and energy may be saved in case of a single individual or a small number of individuals.

It may be further preferred that the observation area is allocated to the respective door and is sectioned into a plurality of zones. Preferably the zones are at least a tracking zone, an activation zone and a safety zone, the safety zone being located closer to the respective door than the activation zone, and the activation zone being located closer to the respective door than the tracking zone, wherein observation image data from the plurality of zones is used to trigger operating the respective door from an opened state into a closed state if a predetermined closing condition is met, wherein the closing condition at least comprises that a respective individual has left one of the plurality of zones.

Closing the door is particularly relevant for saving energy, for instance air conditioning energy with respect to buildings. Therefore, an efficient closing operation is preferred as soon as a detected individual has passed the door and there is no other individual intending to pass the door. This efficient closing mechanism is provided through the mentioned features, in particular through detecting that a predetermined closing condition is met. The predetermined closing condition may be that a respective individual has left one of the plurality of zones. In other words: A transit movement of an individual from a zone which is located closer to the door into a zone which is located less close to the door, may be used as an indicator that the door can be closed.

According to the present disclosure, it is further provided a computer implemented method for operating a door operating system as described above, the method comprising:

detecting an individual inside an observation area,
   extracting pose information and/or viewing direction information corresponding to the respective individual,
   determining, based on the pose information and/or the viewing direction information, a probability value representing the probability that the respective individual intends to pass the door,
   determining whether the probability value is higher than a probability threshold value,
   operating a door from a closed state in an opened state if it is determined that the probability value is higher than a probability threshold value.

According to the present disclosure, it is further provided a computer program product comprising computer-executable instructions which, when executed by an automatic door operating system as described above, causes the automatic door operating system connected to an automatic door to carry out the method according as describes above.

According to the present disclosure, it is further provided an access control system comprising a door and a door operating system as described above.

BRIEF DESCRIPTION OF THE DRAWINGS

The present disclosure will be explained in more detail, by way of example, with reference to the drawings in which.

DETAILED DESCRIPTION OF THE DRAWINGS

Figure 1:
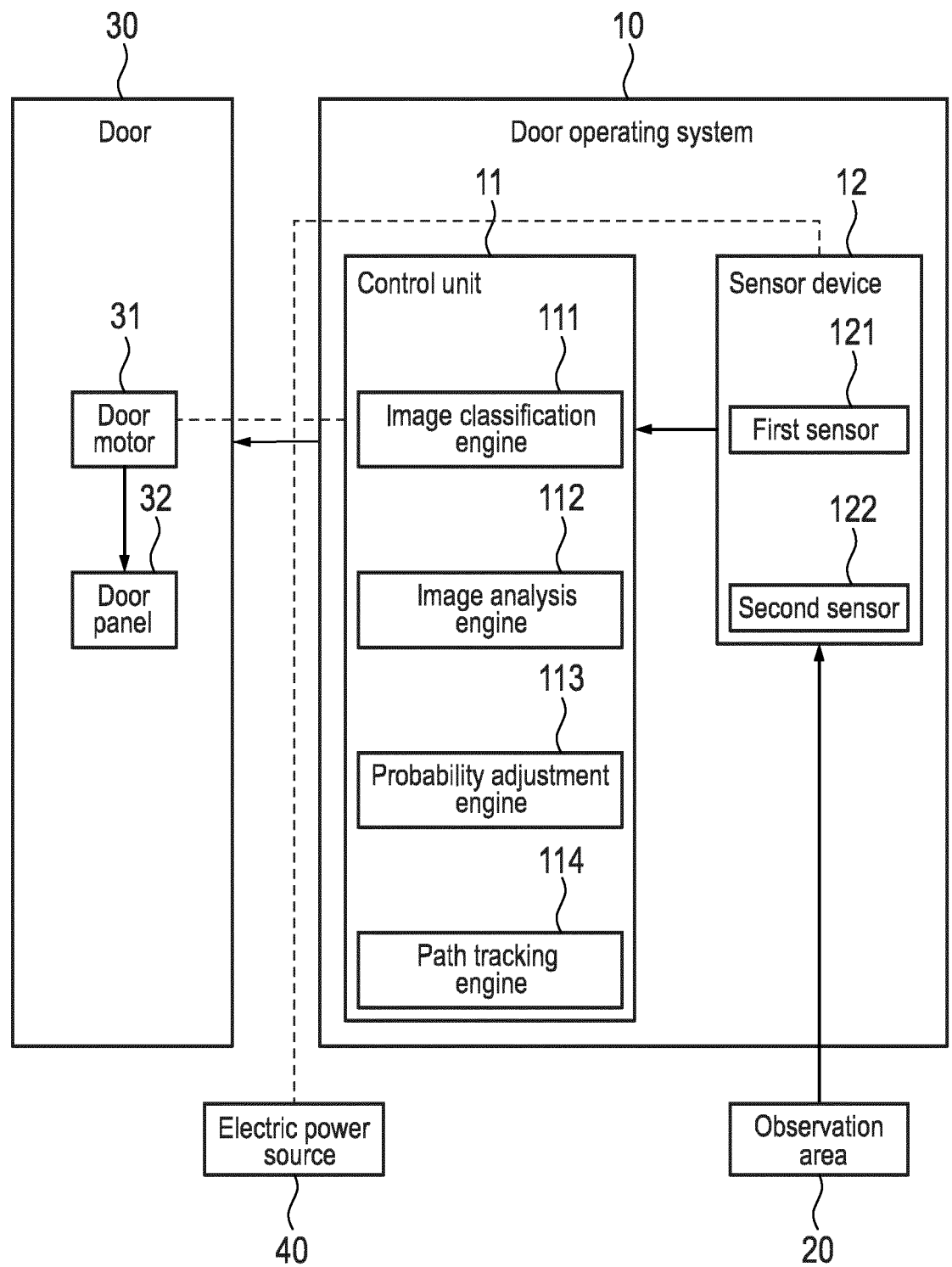
FIG. 1: shows a schematic configuration of an embodiment of the door operating system according to the present disclosure.

FIG. 1 schematically depicts the configuration of an embodiment of the present disclosure. On the right-hand side, the door operating system 10 is illustrated. It includes a control unit 11 and a sensor device 12 and is provided with power through an electric power source 40. The electric power source 40 may be a conventional power grid, a battery, an accumulator, or an electric power generator.

The sensor device 12 according to the embodiment of FIG. 1 comprises a first sensor 121 and a second sensor 122. Each of the first and second sensor 121, 122 are capable to observe an observation area 20. The first sensor 121 is configured to work as a wakeup trigger. This means, it observes the observation area 20 for generally detecting that an object is inside the observation are 20 or has entered the observation are 20. For instance, the first sensor 121 may be based on infrared as widely applied in contemporary door operating systems. If the first sensor 121 detects an object, regardless of what kind of object it is, it triggers the second sensor 122 and/or the control unit 11 to wake up. This gradual activation function is particularly useful for saving energy by only activating devices that are needed depending on the situation in the observation area 20.

After the first sensor 121 detected an object in the observation are 20 and triggered the second sensor 122 to wake up, the second sensor 122 observes the observation area providing a life data feed to the control unit 11. The second sensor 122 is an optical sensor, such as a camera.

Alternatively, the observation area 20 is sectioned into a plurality of zones, e.g. into a tracking zone 21 and an activation zone 22, the activation zone 22 being located closer to the respective door than the tracking zone 21, wherein observation image data received by one sensor 121, 122 from the tracking zone 21 is used to wake up the control unit 11. In this case, only one sensor 121, 122 is needed.

The control unit 11 may be of integrated configuration or alternatively of separated configuration. In case of an integrated configuration, the control unit 11 is integrated within the door operating system, for instance in a housing of the door operating system 10. In case of a separated configuration, the control unit 11 may be a separate device that may be disposed next to the door operating system 10 while being connected to the door operating system via wire or wirelessly. Alternatively, the control unit 11 may be separated by being a network device which is e.g. disposed far away from the door operating system 10. In this case, the door operating system 10 may communicate with the door operating system 10 and the sensor device 12 via a network connection.

The control unit 11 according to the embodiment of FIG. 1 comprises an image classification engine 111, an image analysis engine 112, a probability adjustment engine 113 and a path tracking engine 114.

The image classification engine 111 performs detection of individuals, preferably including the number of individuals, among one or more objects which may be represented by the observation image data obtained by the sensor device 12. The image classification engine 111 is preferably trained via machine learning and therefore includes a computer program enabling machine learning. For training the image classification engine 111, supervised machine learning may be used initially upon installation. An installer may therefore train a certain number of runs during the initial setup. Afterwards, the image classification engine 111 may further develop in accuracy via unsupervised machine learning.

The image analysis engine 112 performs extraction of pose information and/or viewing direction information corresponding to a detected individual. Thereby, the image analysis engine 112 extracts a feature vector corresponding to the respective individual, the feature vector comprising a first set of features indicative for a pose of the individual and/or a second set of features indicative for a viewing direction of the individual.

The feature vector may, in other words, be a superordinate set of features comprising the first and second set of features relating to an individual's pose and viewing direction respectively. The first set of features may for instance comprise at least the position and/or orientation of the legs, feet, arms, body or head. This is for instance shown in FIG. 4 which will be described in detail below. The second set of features may for instance comprise at least the orientation of the nose, forehead, chin or eye sockets. This is for instance shown in FIG. 5 which will be described in detail below.

Further, the first set of features and the second set of features may be at least partially mutually associated, the image analysis engine 112 being configured to perform an inconsistency detection loop on the basis of the associated features for detecting and preferably rectifying the feature vector. Advantageously, information about the direction in which toes of respective feet of the individual are pointing may for example be used to verify if the detection of, e.g. the viewing direction is correct. If needed, the feature vector can be rectified automatically in order to ensure a reliable basis for determining the probability value whether an individual intends to pass the door.

The image analysis engine 112 may be trained by means of machine learning, preferably unsupervised machine learning. Therefore, the image analysis engine 112 may include a computer program enabling machine learning.

The probability adjustment engine 113 performs dynamic adjustment of the probability threshold value, wherein the probability adjustment engine 113 validates, for a detected individual for whom it is determined that the probability value is higher than a probability threshold value, whether the respective individual actually passed the respective door. The probability threshold value is a value that indicates that a detected individual intends to pass the door. For example, the probability threshold value can be a percentage number or an absolute normalized number.

Adjusting the probability threshold value via the probability adjustment engine 113 may be carried out through calculation of a validity rate representing the rate of individuals for which the decision that the individual intends to pass the door, was determined correctly. The validity rate may be compared with a predefined target validity rate which represents a desired validity rate of e.g. 95%. Based on the comparison, the probability threshold value may be raised or lowered. In particular, the probability threshold value may be raised, if the validity rate is lower than the target validity rate and vice versa. The target validity rate representing a desired validity rate preferably takes into account an optimal balance between two objectives: the prevention of false openings and the prevention of false non-openings. The target validity rate may alternatively be a target validity interval of e.g. 90 to 95%.

The path tracking engine 114 extracts and considers path information from the obtained image data for determining the probability value representing the probability that the respective individual intends to pass the door. The path tracking engine 114 therefore provides a set of most frequently used paths for passing a respective door and considers, based on motion of a detected individual, whether the respective individual is about to use one of the most frequently used paths, wherein preferably the set of most frequently used paths is obtained and/or dynamically updated through machine learning.

The most frequently used paths are usually different according to the position of a door. For example, the most frequently used paths are different if an entrance door is placed on a corner of a building, in comparison with placing an entrance door in the center of the building. Therefore, machine learning, preferably unsupervised machine learning, may take the overall circumstances of where a respective door is placed into account. Over time, the most frequently used paths are trained by the path tracking engine such that the information about on which path a detected individual is moving, may be considered for getting a higher accuracy in operating the door.

On the left-hand side of FIG. 1, a door 30 is illustrated. The door 30 comprises at least a door motor 31 and a door panel 32, wherein the door 30 can receive operation commands from the door operating system 10. The operation commands may particularly be directly received from the control unit 11.

An operation command may trigger the door 30 to operate from a closed state into an opened state or to operate from an opened state into a closed state. Further, an operation command may be of a negative type, this is if the operation command triggers the door to remain open or closed in a respective situation.

For instance, if the door 30 receives an operating command from the door operating system 10 to operate from a closed state into an opened state, the door 30 may trigger the door motor 31 to move one or more door panels 32. In case of a sliding door, there may be provided two door panels 32.

With respect to the above-mentioned features, in summary, a door operating system 10 is provided, comprising a control unit 11 and at least one sensor device 12, the door operating system being configured to operate a door 30 from a closed state into an opened state, wherein the sensor device 12 is configured to observe an observation area 20 and provide respective observation image data to the control unit 11, wherein the control unit 11 is configured to receive and process the observation image data, wherein processing the observation image data comprises at least:

detecting an individual inside the observation area 20,
 extracting pose information and/or viewing direction information corresponding to the respective individual 50,
 determining, based on the pose information and/or the viewing direction information, a probability value representing the probability that the respective individual 50 intends to pass the door 30,
 determining whether the probability value is higher than a probability threshold value, wherein the door operating system 10 operates the door 30 from a closed state in an opened state if the control unit 11 determines that the probability value is higher than a probability threshold value.

The pose information may include motion of pose of the respective individual 50 and the viewing direction information may include motion of viewing direction of the respective individual 50.

Figure 2:
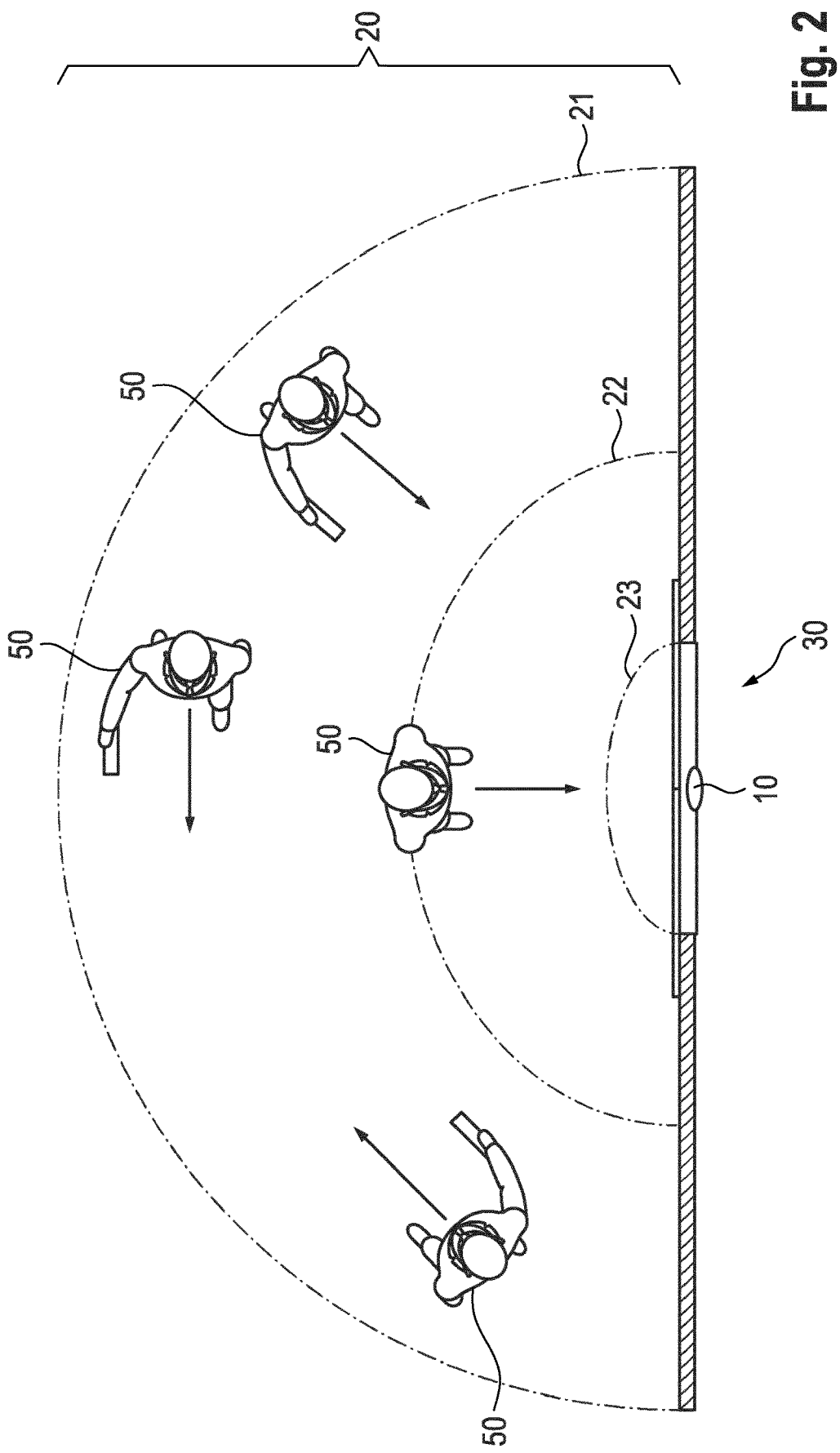
FIG. 2: shows a highly schematic top view of an embodiment of an access control system including a door operating system according to the present disclosure including a respective observation area comprising three zones.

FIG. 2 shows a highly schematic top view of one of the two sides of a door 30 including a door operating system 10 according to an embodiment of the present disclosure which observes an observation area 20. The observation area 20 is allocated to the door 30 and is sectioned into a plurality of zones 21, 22, 23, namely a tracking zone 21, an activation zone 22 and a safety zone 23. The door operating system 10, in particular the sensor device 12 and/or the control unit 11, is capable of distinguishing between the zones by means of predefined virtual borders between adjacent zones.

The safety zone 23 is located closer to the door 30 than the activation zone 22, and the activation zone 22 is located closer to the door 30 than the tracking zone 21. The observation image data from the tracking zone 21 is used to wake up the control unit 11 and/or respective engines 111, 112, 113, 114 if an object, preferably an individual 50, enters the tracking zone 21.

Further, the different zones may be observed by different sensors, for instance the tracking zone 21 may be observed by a first sensor 121 of the sensor device 12, while the activation zone 22 and the safety zone 23 may be observed by a second sensor 122 of the sensor device as described above. In this case, the first sensor 121 may trigger the second sensor 122 and/or the control unit 11 to wake up, as described above. The observation image data from the activation zone 22 may be processed by the control unit 11 to detect an individual 50 that intends to pass the door 30 in order to trigger operating the door 30 from a closed state into an opened state if needed. For safety purposes, observation image data from the safety zone 23 may be used to operate the door 30 into a safety mode, wherein in the safety mode the door 30 is operated from a closed state into an opened state irrespective of the probability value. Alternatively, or additionally, it may be provided that the door 30 is operated to stay open, if it is in an opened state and the sensor device 12 detects that an individual 50 is in the safety zone 23.

Figure 3:
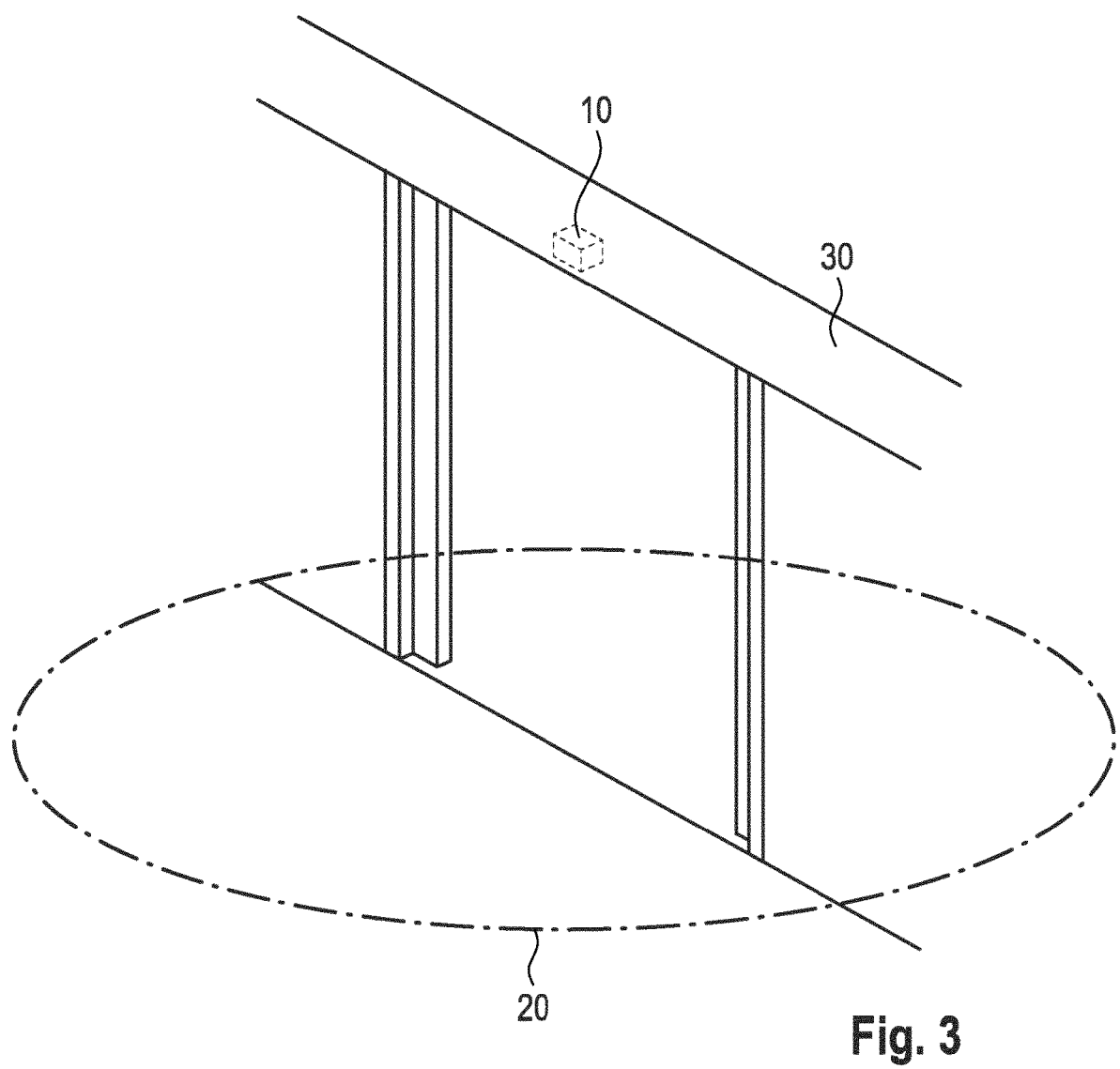
FIG. 3: shows a highly schematic perspective view of an embodiment of an access control system including a door operating system according to the present disclosure including a respective observation area.

FIG. 3 is a highly schematic perspective view of an embodiment of an access control system including a door operating system 10 of one embodiment of the present disclosure, wherein a both-sided observation area 20 is illustrated. The two sides of the door 30 may be observed by one single door operating system 10 or may be observed by two separate door operating systems 10. The partitioning of the observation area 20 into zones as described above in the context of FIG. 2, may be mirrored for the other side of the door 30.

Figure 4:
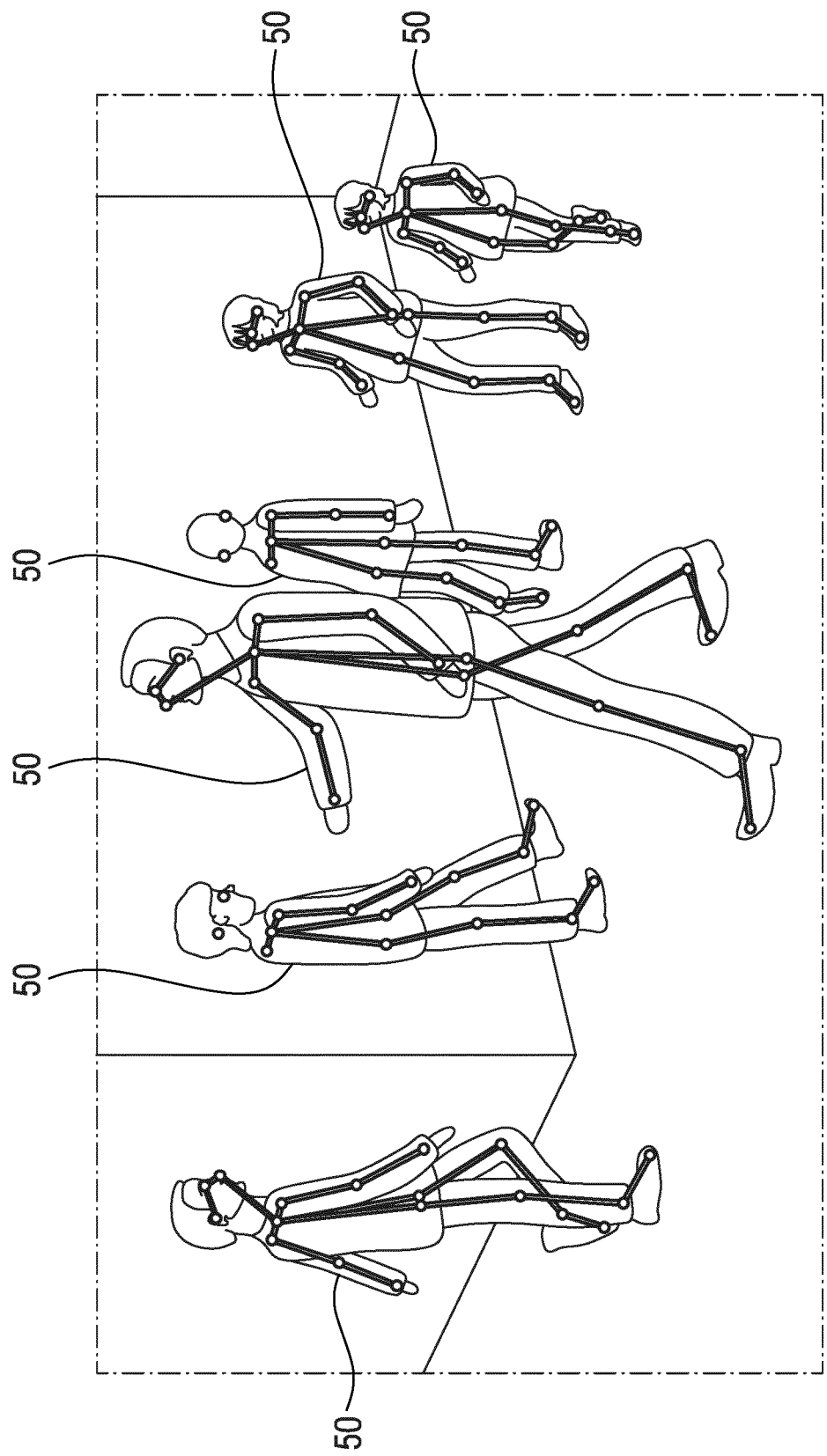
FIG. 4: shows a highly schematic view of a scene that may be observed by a door operating system according to the present disclosure to be processed for extracting pose and/or viewing direction information.

FIG. 4 shows a highly schematic view of a scene that may be observed by a door operating system 10 according to the present disclosure to be processed for extracting pose and/or viewing direction information of detected individuals 50. The basis for extracting the information is, as shown, the extremities of the individuals 50 respectively the skeleton of the individuals 50. The extremities respectively the skeleton is extrapolated by the control unit 11, in particular by the image analysis engine 112 of the control unit 11, based on the observation image data being the input data.

Figure 5:
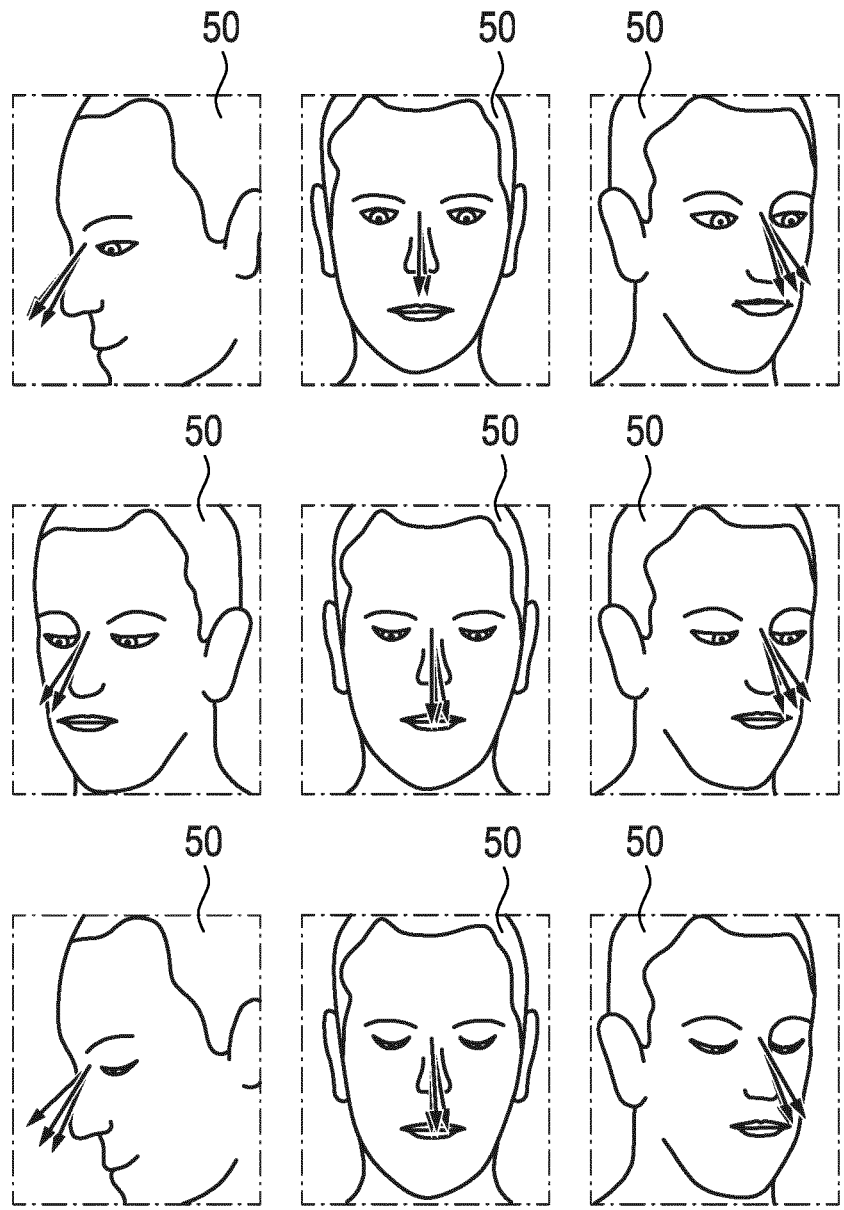
FIG. 5: shows a highly schematic view of heads of individuals with different viewing directions that may be extracted by a door operating system according to the present disclosure.

FIG. 5 shows a highly schematic view of heads of individuals 50 with different viewing directions that may be extracted by a door operating system 10 according to the present disclosure.

Therefore, with respect to FIGS. 4 and 5, as described above, extracting pose information and/or viewing direction information corresponding to an individual 50 is performed, wherein a feature vector corresponding to the respective individual 50 is extracted, the feature vector comprising a first set of features indicative for a pose of the individual 50 and/or a second set of features indicative for a viewing direction of the individual 50.

The feature vector may, in other words, be a superordinate set of features comprising the first and second set of features relating to an individual's pose and viewing direction respectively. The first set of features may for instance comprise at least the position and/or orientation of the legs, feet, arms, body or head. The second set of features may for instance comprise at least the orientation of the nose, forehead, chin or eye sockets.

Further, the first set of features may at least comprise the orientation of one or more extremities of a skeleton of a respective individual 50, preferably at least the direction in which toes of respective feet of the individual 50 are pointing.

The direction in which toes of respective feet of the individual are pointing, is one of the most valuable characteristics of the skeleton for estimating the direction in which an individual 50 is facing. The information is an especially useful indicator for determining that an individual 50 is at all considering passing through the door 30.

Further, the first set of features and the second set of features may be at least partially mutually associated, the image analysis engine 112 of the control unit 11 being configured to perform an inconsistency detection loop on the basis of the associated features for detecting and preferably rectifying the feature vector.

Advantageously, information about the direction in which toes of respective feet of the individual 50 are pointing may for example be used to verify if the detection of, e.g. the viewing direction is correct. If needed, the feature vector can be rectified automatically in order to ensure a reliable basis for determining the probability value whether an individual 50 intends to pass the door 30.

Further, the image analysis engine 112 may be trained by means of machine learning, preferably unsupervised machine learning.

Figure 6:
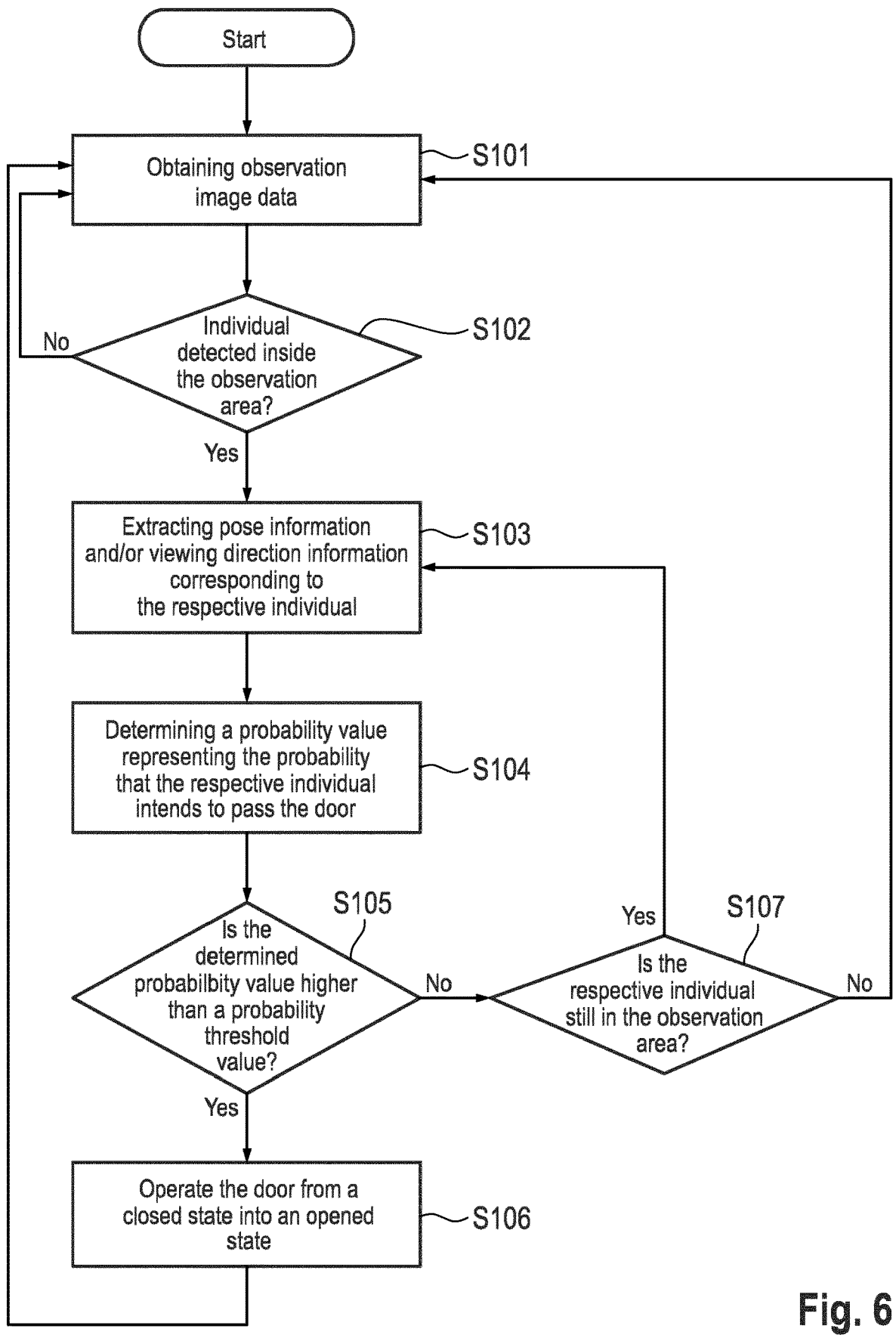
FIG. 6: shows a flow chart illustrating a sequence of steps that may be carried out through a door operating system according to the present disclosure.

FIG. 6 shows a flow chart illustrating a sequence of steps that may be carried
out through a door operating system 10 according to the present disclosure. Firstly, the observation image data corresponding to the observation area 20 is obtained and is it analyzed whether an individual 50 is inside the observation area 20 (steps S101, S102). If an individual 50 is detected inside the observation area 20, extracting pose information extracting pose information and/or viewing
direction information corresponding to the respective individual 50 is performed
(step S103). Afterwards, it is determined, based on the pose information and/or the viewing direction information, a probability value representing the probability that the respective individual 50 intends to pass the respective door 30 (step S104). Further, it is determined whether the probability value is higher
than a probability threshold value (step S105). If the probability value is higher
than a probability threshold value, operating the respective door 30 from a closed state in an opened state is performed (step S106). If the probability value is not higher than a probability threshold value, the door operating system 10 continues with obtaining observation image data (step S107).

The invention claimed is:

1. A door operating system comprising a control unit and at least one sensor device, the door operating system being configured to operate a door from a closed state into an opened state,
   wherein the sensor device is configured to observe an observation area
   and provide respective observation image data to the control unit,
   wherein the control unit is configured to receive and process the observation image data,
   wherein processing the observation image data comprises at least:
      detecting an individual among other objects inside the observation area including distinguishing between individuals and non-individuals, being carried out based on the shape of a detected object,
      extracting pose information and/or viewing direction information corresponding to the respective individual,
      determining, based on the pose information and/or the viewing direction information, a probability value representing the probability that the respective individual intends to pass the door,
      determining whether the probability value is higher than a probability threshold value, wherein the door operating system operates the door from a closed state in an opened state if the control unit determines that the probability value is higher than a probability threshold value, wherein extracting pose information and/or viewing direction information corresponding to the respective individual is performed by an image analysis engine, wherein the image analysis engine is configured to extract a feature vector corresponding to the respective individual, the feature vector comprising a first set of features indicative for a pose of the individual and/or a second set of features indicative for a viewing direction of the individual, wherein the first set of features and the second set of features are at least partially mutually associated, the image analysis engine being configured to perform an inconsistency detection loop on the basis of the associated features for detecting and rectifying the feature vector.

2. The door operating system of claim 1, wherein the pose information includes motion of pose of the respective individual and/or viewing direction information includes motion of viewing direction of the respective individual.

3. The door operating system of claim 1, wherein detecting an individual inside the observation area is performed by an image classification engine, wherein the image classification engine is configured to detect individuals, among one or more objects which may be represented by the observation image data, the image classification engine being trained via machine learning.

4. The door operating system of claim 1, wherein the first set of features at least comprises the orientation of one or more extremities of a skeleton of the respective individual, at least the direction in which toes of respective feet of the individual are pointing.

5. The door operating system of claim 1, wherein the image analysis engine is trained by machine learning.

6. The door operating system of claim 1, wherein the probability threshold value is dynamically adjusted by a probability adjustment engine, wherein the probability adjustment engine validates, for a detected individual for whom it is determined that the probability value is higher than a probability threshold value, whether the respective individual actually passed the respective door.

7. The door operating system of claim 1, wherein in determining the probability value representing the probability that the respective individual intends to pass the door, path information obtained by a path tracking engine is considered, wherein the path tracking engine provides a set of most frequently used paths for passing a respective door and considers, based on motion of a detected individual, whether the respective individual is about to use one of the most frequently used paths, wherein the set of most frequently used paths is obtained or dynamically updated through machine learning.

8. The door operating system of claim 1, wherein the observation area is allocated to the respective door and is sectioned into a plurality of zones, namely at least a tracking zone and an activation zone, the activation zone being located closer to the respective door than the tracking zone, wherein observation image data from the tracking zone is used to wake up the control unit and/or respective engines if an object enters the tracking zone, wherein observation image data from the activation zone is used to trigger operating the respective door from a closed state into an opened state.

9. The door operating system of claim 1, wherein the observation area is allocated to the respective door and is sectioned into a plurality of zones, namely at least an activation zone and a safety zone, the safety zone being located closer to the respective door than the activation zone, wherein observation image data from the activation zone is used to trigger operating the respective door from a closed state into an opened state, wherein observation image data from the safety zone is used to operate the respective door into a safety mode, wherein in the safety mode the respective door is operated from a closed state into an opened state irrespective of the probability value.

10. The automatic door operating system of claim 1, wherein operating the respective door from a closed state into an opened state is performed using a door motor disposed at the door configured to open the door, wherein the opening speed of the door is set depending on motion speed of the respective individual and/or the opening width of the door is set depending on the quantity of detected respective individuals.

11. The door operating system of claim 1, wherein the observation area is allocated to the respective door and is sectioned into a plurality of zones, at least a tracking zone, an activation zone and a safety zone, the safety zone being located closer to the respective door than the activation zone, and the activation zone being located closer to the respective door than the tracking zone, wherein observation image data from the plurality of zones is used to trigger operating the respective door from an opened state into a closed state if a predetermined closing condition is met, wherein the closing condition at least comprises that a respective individual has left one of the plurality of zones.

12. A computer implemented method for operating a door operating system according to claim 1, the method including the following steps:

detecting an individual inside an observation area, extracting pose information and/or viewing direction information corresponding to the respective individual, determining, based on the pose information and/or the viewing direction information, a probability value representing the probability that the respective individual intends to pass the door, determining whether the probability value is higher than a probability threshold value, and operating a door from a closed state in an opened state if it is determined that the probability value is higher than a probability threshold value.

13. An access control system comprising a door and a door operating system according to claim 1.

* * * * *